(12) United States Patent
Li et al.

(10) Patent No.: US 10,660,117 B2
(45) Date of Patent: *May 19, 2020

(54) METHOD AND DEVICE FOR TRANSMITTING DATA

(71) Applicant: Samsung Electronics Co., Ltd., Suwon-si, Gyeonggi-do (KR)

(72) Inventors: Yingyang Li, Beijing (CN); Shichang Zhang, Beijing (CN); Yi Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/546,009

(22) Filed: Aug. 20, 2019

(65) Prior Publication Data

US 2019/0373622 A1 Dec. 5, 2019

Related U.S. Application Data

(63) Continuation of application No. 15/595,749, filed on May 15, 2017, now Pat. No. 10,425,959.

(30) Foreign Application Priority Data

May 13, 2016 (CN) .......................... 2016 1 0320328
Jul. 25, 2016 (CN) .......................... 2016 1 0594701
(Continued)

(51) Int. Cl.
*H04W 72/12* (2009.01)
*H04L 5/00* (2006.01)
(Continued)

(52) U.S. Cl.
CPC ....... *H04W 72/1231* (2013.01); *H04L 5/0048* (2013.01); *H04L 5/0094* (2013.01);
(Continued)

(58) Field of Classification Search
CPC ............. H04W 72/1231; H04W 24/08; H04W 72/1278; H04L 5/0048
See application file for complete search history.

(56) References Cited

U.S. PATENT DOCUMENTS 10,425,959 B2 * 9/2019 Li .................... H04W 72/1231
2015/0326362 A1 11/2015 Xiong et al.
(Continued)

FOREIGN PATENT DOCUMENTS

WO 2016036182 A1 3/2016
WO 2016056993 A2 4/2016

OTHER PUBLICATIONS

International Search Report dated Jul. 24, 2017 in connection with International Patent Application No. PCT/KR2017/005024, 3 pages.
(Continued)

*Primary Examiner* — Siming Liu

(57) ABSTRACT

A first device senses scheduling assignment (SA) and received power of a second device, and a total received energy of each subband. The first device determines a reference value of received power of the second device and a reference value of total received energy, based on a sensing result of the second device. The first device selects a resource, based on the reference value of received power and reference value of total received energy, the first device transmits data. By adopting the method of the present disclosure, decoding performance of SA is improved, and accuracy for measuring received power of the SA is also enhanced. Subsequently, on the basis of SA and received power, performances for selecting/re-selecting channel resources are improved.

20 Claims, 11 Drawing Sheets device A senses SA and received power of a second device, and total received energy of each sub-band — 401 device A selects a resource and transmits data, based on sensing for the second device, a reference value of received power of the second device and a reference value of total received energy — 402

(30) Foreign Application Priority Data

Sep. 22, 2016 (CN) .......................... 2016 1 0842780
Nov. 23, 2016 (CN) .......................... 2016 1 1042582

(51) Int. Cl.
  *H04L 5/16* (2006.01)
  *H04W 52/16* (2009.01)
  *H04W 52/38* (2009.01)
  *H04W 24/08* (2009.01)

(52) U.S. Cl.
  CPC .............. *H04L 5/16* (2013.01); *H04W 24/08* (2013.01); *H04W 52/16* (2013.01); *H04W 52/383* (2013.01); *H04W 72/1278* (2013.01); *H04L 5/006* (2013.01)

(56) References Cited

U.S. PATENT DOCUMENTS

2016/0204885 A1 7/2016 Sorrentino et al.
2017/0230926 A1 8/2017 Seo et al.

OTHER PUBLICATIONS

Catt, "Discussion on UE autonomous resource allocation in PC5-based V2V", 3GPP TSG RAN WG1 Meeting #84bis, Apr. 11-15, 2016, 5 pages, R1-162267.

Intel Corporation, "On Sensing Design Details for Sidelink V2V Communication", 3GPP TSG RAN WG1 Meeting #84bis, Apr. 11-15, 2016, 10 pages, R1-162363.

Etri, "Discussion of sensing algorithms for mode 2 resource selection", 3GPP TSG RAN WG1 Meeting #78, Aug. 18-22, 2014, 5 pages, R1-143051.

Lenovo, "Mechanisms for V2V resource allocation", 3GPP TSG RAN WG1 Meeting #84, Feb. 15-19, 2016, 7 pages, R1-161014.

Samsung, "Details on sensing based resource (re)selection", 3GPP TSG RAN WG1 Meeting #86, Aug. 22-26, 2016, 5 pages, R1-166714.

Supplementary European Search Report dated Jan. 14, 2019 in connection with European Patent Application No. 17 79 6459, 8 pages.

* cited by examiner

METHOD AND DEVICE FOR TRANSMITTING DATA

CROSS-REFERENCE TO RELATED APPLICATIONS

This application is a continuation of application Ser. No. 15/595,749, filed May 15, 2017, which claims priority to Chinese Patent Application No. 201610320328.0, filed May 13, 2016, Chinese Patent Application No. 201610594701.1, filed Jul. 25, 2016, Chinese Patent Application No. 201610842780.3, filed Sep. 22, 2016, and Chinese Patent Application No. 201611042582.5, filed Nov. 23, 2016, the contents of which are incorporated herein by reference.

BACKGROUND

1. Field

The present disclosure relates to wireless communications technologies, and more particularly, to a method and a device for transmitting data in a vehicle to everything (V2X) system.

2. Description of Related Art

At present, Device to Device (D2D) communication technologies have already been accepted by the third Generation Partnership Project (3GPP) standard, depending on great potential value thereof in public safety field and general civil communication field. Standardizations of some functions of D2D communication technologies have already been achieved in 3GPP Rel-12, which include mutual discoveries of D2D terminals in a cell coverage scenario, and broadcast communications among D2D terminals in a In Coverage (IC) scenario, a Partial Coverage (PC) scenario and an Out of Coverage (OC) scenario.

At present, 3GPP Rel-12 standard defines two kinds of D2D broadcast communication modes, which are referred to as Mode 1 and Mode 2 for short. Mode 1 requires that a user equipment (UE), which transmits a D2D broadcast communication, must be an in coverage UE (ICUE) under a cellular network. The UE obtains configuration information of a physical sidelink control channel (PSCCH) resource pool of Mode 1, by receiving system broadcast signaling from an evolved Node B (eNB). Foregoing configuration information of PSCCH resource pool includes a PSCCH period, a position of a subframe for transmitting PSCCH within each period, and a position of a physical resource block (PRB) for transmitting PSCCH within each subframe. When there is data for a UE supporting Mode 1 broadcast communication, the UE applies for dedicated Mode 1 communication resources to an eNB via a specific buffer status report (BSR). Subsequently, the UE senses sidelink grant of the eNB before each PSCCH period, obtains a position of a resource for transmitting PSCCH and physical sidelink shared channel (PSSCH) within the PSCCH period. In Mode 1, resource conflicts among different UEs may be avoided, through centralized control of the eNB.

A UE transmitting D2D broadcast communications in Mode 2 may be an ICUE, or may be an OCUE outside the coverage of a cellular network. The ICUE obtains a PSCCH resource pool of Mode 2, and configurations of an associated PSSCH resource pool, by receiving broadcast signaling of an eNB system. The PSSCH resource pool includes a position of a subframe for transmitting PSSCH within an associated PSCCH period, and a position of a PRB for transmitting PSSCH within each subframe. Randomly select resources for transmitting PSCCH and associated PSSCH within each PSCCH period. The OCUE determines a PSCCH resource pool of Mode 2, and configurations of an associated PSSCH resource pool, by using preconfigured information. Resource selection mode of the OCUE is the same as that of the ICUE. In the PC scene, configurations of a Mode 2 resource pool preconfigured by an OCUE are relevant with carrier frequency, system bandwidth, and/or, time division duplexing (TDD) configurations of a cell located by an ICUE, which participates in a D2D broadcast communication.

In foregoing two kinds of D2D broadcast communication modes, the PSCCH resource pool and the PSSCH resource pool, or PSSCH resource are bound with a one-to-one correspondence. Within each PSCCH period, the PSCCH resource pool is located before the associated PSSCH resource pool, or PSSCH resource, and resources thereof are not overlapped. In addition, a D2D terminal always operates in a half-duplex mode. Thus, terminals simultaneously transmitting cannot receive a signal from a peer end. In Rel-12, each PSCCH will be transmitted twice within each PSCCH period. Each PSCCH transmission occupies one PRB. And foregoing half-duplex limitations may be solved, by using resource hopping. For example, for PSCCH transmitted with the same subframe in a first transmission, an offset may be generated for a position of a subframe transmitting such resource in a second transmission. Offset magnitude is relevant with frequency domain position of the first resource transmission. Thus, for PSCCH transmitted with the same subframe in the first transmission, it is guaranteed that position of subframe for re-transmitting the PSCCH is different. Besides, two transmissions may ensure reliability of PSCCH reception.

FIG. 1 illustrates a structure of an uplink subframe in a 3GPP D2D system. In 14 Orthogonal Frequency Division Multiplexing (OFDM) symbols of one subframe, two OFDM symbols are used for transmitting a Demodulation Reference Signal (DMRS). Symbol indexes of the foregoing two OFDM symbols are respectively 3 and 10. The last OFDM symbol of the subframe is punctured fixedly, which is used for generating transceiver conversion time of a device, and avoiding overlapping of two adjacent subframes resulted from problems, such as transmission delay, timing advance. Other symbols are used for transmitting uplink data. Here, the first OFDM symbol of the subframe also transmits data. However, when implementing practically, this OFDM symbol may be taken as automatic gain control (AGC).

Since 3GPP D2D communications mainly aim at low speed terminals, and V2X services with lower requirements of delay sensitivity and reception reliability, D2D functions already achieved are far from meeting users' requirements. In each subsequent 3GPP version, it is a wide consensus to further enhance the D2D functional framework, which is achieved by each communication terminal manufacture and communication network equipment manufacture at present. Based on current D2D broadcast communication mechanism, Vehicle to Vehicle/Pedestrian/Infrastructure/Network (V2X), which supports a direct low-delay communication with higher-reliability between high-speed devices, between a high-speed device and a low-speed device, between a high-speed device and a stationary device, is one function needing to be standardized firstly.

Requirements of main application scenes of D2D are met by the structure of the uplink subframe, which is shown in FIG. 1. However, for a typical V2X application scene, e.g., the highest UE relative speed supported by the V2X communication is 500 km/h, the carrier frequency may achieve 6 GHz, serious inter-subcarrier interferences may be brought about by Doppler shift resulted from high-speed and high carrier frequency. In addition, take into account influences of timing offset and frequency offset between a base station and a UE, performance requirements cannot be met by the DMRS structure shown in FIG. 1. In current discussions of standardization conferences, FIG. 2 shows an important solution, that is, DMRS is transmitted on 4 OFDM symbols, so as to improve time density of DMRS. In other words, indexes of DMRS symbols are respectively 2, 5, 8 and 11, so as to provide better performances.

In a 3GPP D2D system, DMRS sequences of PSCCH are fixed. That is, all the transmitters adopt the same DMRS sequence. Specifically, on the basis of a DMRS generation method in a long term evolution (LTE), the root sequence of the DMRS is obtained based on a physical cell identity (PCID) 510. Cyclic shift (CS) of the DMRS is fixed to be 0. Orthogonal cover code (OCC) of the DMRS is fixed to be [1 1]. Scrambling sequence of scheduling information carried by PSCCH is also fixed. That is, all the transmitters adopt the same scrambling sequence. Specifically, on the basis of a scrambling-code generation method in the LTE, PCID is configured to be 510. Other information, such as a time slot index, a UE ID, is fixed to be 0. Based on such method, when two devices transmit SA on the same PRB, DMRSs of the two devices are completely overlapped, which is equivalent to one DMRS sequence at a receiver. Since terminal density in the V2X communication is much higher than that in D2D, the probability for at least two devices to transmit SA and/or data on the same resource is greatly increased, that is, a case where SA resources are conflicted. In addition to foregoing conflicts, even if two sending devices transmit data with different frequencies of the same subframe, reception performance may also be reduced by in-band leakage interference, taking into account influences of distance effect. That is, for a receiver, compared with energies given away to other adjacent PRBs by a device very close, energies on these adjacent PRBs coming from remote devices may be in the same order of magnitude, or even weaker. Since terminal density in the V2X communication is much higher than that in D2D, foregoing in-band leakage interference may become even worse.

Based on discussions in current standardization conferences, one solution is to solve foregoing problems of collision and in-band leakage based on sensing. One basic assumption here is to occupy resources by a device with semi-persistent scheduling (SPS). That is, resources occupied by a device are periodical within a duration. As shown in FIG. 3, a time point that a device selects PSCCH/PSSCH resources is represented with subframe n. Within a time period from subframe (n−a) to subframe (n−b), a device firstly senses resources within a resource pool thereof, and determines which time-frequency resources are occupied and which time-frequency resources are idle. And then, the device selects PSCCH/PSSCH resources within subframe n. Denote that PSCCH is transmitted within subframe (n+c), PSSCH is transmitted within subframe (n+d), and a reserved resource is in subframe (n+e). Subsequently, the device transmits PSCCH in subframe (n+c), transmits PSSCH in subframe (n+d), and transmits a next data within the reserved resource of subframe (n+e). More particularly, when c is equal to d, PSCCH and PSSCH are located within the same subframe. There are two modes for foregoing device to sense resources within the resource pool thereof. A first mode is to obtain accurate information of channels occupied by other devices, after decoding PSCCH, so as to measure received power of a corresponding device. The other mode depends on sensing energy of a PSSCH resource pool. The first method may obtain accurate information about channel occupation and reservation. However, when the PSCCH is not correctly received, e.g., when PSCCH collisions of multiple devices occur, the PSCCH-based sensing is failed. The second method is to determine whether resources are occupied, based on level of sensed energy, so as to avoid using occupied resources as much as possible. However, since a V2X service is not strictly periodic, message periods of various devices may also be different within a time period, which affects predictive performances of the energy-based sensing method. Practically, the PSCCH-based sensing and energy-based sensing may be used in combination, so as to avoid collision and interference as much as possible, and improve performances. When the PSCCH is correctly received, how to sense energies of the PSCCH is an urgent problem to be solved.

SUMMARY

To address the above-discussed deficiencies, it is a primary object to provide a method, a device and a base station for transmitting data. By adopting the method, performances for successfully receiving SA may be enhanced, and measurement accuracy of received power of the SA may also be improved. Subsequently, the received power based on SA and device may be improved. Collision and interference among devices may be better avoided.

To achieve foregoing objectives, the present disclosure adopts the following technical solutions.

A method for transmitting data, including sensing, by a first device, scheduling assignment (SA) and received power of a second device, and a total received energy of each subband, determining, by the first device, a reference value of received power of the second device and a reference value of the total received energy, based on a sensing result of the second device, selecting a resource, by the first device, based on the reference value of received power and the reference value of the total received energy, and transmitting data, by the first device, by using the selected resource.

Preferably, sensing by the first device the SA of the second device includes, for a SA successfully decoded, measuring the received power of the SA, based on a Demodulation Reference Signal (DMRS) of the SA, wherein there are multiple DMRS sequences.

Preferably, sensing by the first device the SA of the second device includes decoding, by the first device, the SA of the second device, for a SA successfully decoded, generating a modulation symbol sequence of a data portion of the SA, based on the decoded SA, measuring the received power of the SA successfully decoded, based on the modulation symbol sequence.

Preferably, sensing by the first device the SA of the second device includes decoding, by the first device, the SA of the second device, for a SA successfully decoded, sensing received power of a DMRS of a data channel, which is scheduled by the SA.

Preferably, sensing by the first device the SA and received power of the second device includes, for a resource of the second device, when the first device received a first SA scheduling the resource, the first device does not receive a second SA scheduling the resource within a period, the first device receives a third SA scheduling another resource of the second device within the period, wherein the third SA received does not indicate to release resources, not releasing the resource, and measuring, by the first device, the received power on the resource.

Preferably, sensing by the first device the SA and received power of the second device includes, when the first device does not receive a fourth SA scheduling the second device within a period, however, the first device receives a fifth SA scheduling the second device within the period, wherein the fifth SA does not indicate to release resources, not releasing the resource by the second device; and measuring, by the first device, the received power of the second device on the resource.

Preferably, sensing by the first device the SA and received power of the second device includes, when the first device does not receive a data channel of a resource of the second device within a period, obtaining the received power of the second device within the period, based on a data transmission of the second device on the resource within another period, or, obtaining the received power of the second device on the resource, based on a data transmission of the second device on another resource, or, measuring the received power of the second device, based on the SA of the second device, or, enabling the resource to be un-available to the first device, by configuring the reference value of received power of the second device, or, wherein the resource is not used to obtain the reference value of received power of the second device.

Preferably, selecting the resource includes for a SA, when a resource scheduled by the SA is located after subframe n, not performing a resource reservation for the resource, or, obtaining the received power on the resource, and processing the resource reservation.

Preferably, determining the reference value of received power of the second device and the reference value of total received energy includes determining a reference value of received power on a channel resource, which is occupied by the second device subsequently, based on a measurement value of received power of the second device within a sensing window, and, determining the reference value of received energy on a subband, based on the measurement value of total received energy of each subband within the sensing window.

Preferably, the reference value of received power of the second device includes at least one of the last measurement value of received power of the second device within the sensing window, an average value of measurement values of received power about the second device within the sensing window, a weighted average value of measurement values of received power about the second device within the sensing window; or, a sliding average value of measurement values of received power about the second device within the sensing window.

Preferably, for the $k^{th}$ resource of the second device, the reference value of received power on the $k^{th}$ resource of the second device includes at least one of a measurement value of the last received power corresponding to the $k^{th}$ resource within the sensing window, an average value of measurement values of received power corresponding to the $k^{th}$ resource within the sensing window, a weighted average value of measurement values of received power corresponding to the $k^{th}$ resource within the sensing window, or, a sliding average value of measurement values of received power corresponding to the $k^{th}$ resource within the sensing window.

Preferably, for the $k^{th}$ resource of the second device, on the basis of a subband occupied by the $k^{th}$ resource of the second device, the reference value of received power on the $k^{th}$ resource of the second device includes at least one of a measurement value of received power on a subband, which is occupied by the second device for the last time within the sensing window, an average value of measurement values of received power on a subband, which is occupied by the second device within the sensing window, a weighted average value of measurement values of received power on a subband, which is occupied by the second device within the sensing window; or, a sliding average value of measurement values of received power on a subband, which is occupied by the second device within the sensing window.

Preferably, the measurement value of received power includes an average value of received power on all the subbands, which are occupied by the second device in a subframe, or, the received power on a resource occupied by the second device within a subframe, which is measured by taking subband as granularity.

Preferably, determining the reference value of received power of the second device includes determining the reference value of received power of the second device, by using all the measurement values of received power of the second device within the sensing window, or, determining the reference value of received power of the second device, by using a measurement value of received power on un-released resources of the second device within the sensing window.

Preferably, determining the reference value of received power on the channel resource occupied by the second device subsequently, based on the measurement value of received power of the second device within the sensing window, includes determining the reference value of received power of a subsequent transmission about the second device, based on each measurement value of received power of the second device within the sensing window, and change trend of the each measurement value.

Preferably, when $P_{ref}+X$ is greater than a threshold, the resource occupied by the second device is not available, wherein $P_{ref}$ is the reference value of received power of the second device, and X is an offset value.

A device for transmitting data, including a sensing module, a resource selecting module and a transceiver module, wherein the sensing module is configured to SA and received power of a second device, and a total received energy of each sub and, the resource selecting module is configured to determine a reference value of received power of the second device and a reference value of total received energy, based on a sensing result of the second device, and select a resource, based on the reference value of received power and the reference value of total received energy, and the transceiver module is configured to transmit data, by using the selected resource.

By adopting the method in the present disclosure, decoding performance of the SA may be improved, accuracy for measuring the received power of the SA may be increased, and performances for selecting/re-selecting channel resources based on SA and the received power may also be improved.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

To make objectives, technical solutions and advantages of the present disclosure more clear, detailed descriptions of the present disclosure are further provided in the following, accompanying with attached figures and embodiments.

In V2X communications, there may be many devices within a certain area, which include vehicles, pedestrian and a Road Side Unit (RSU). Besides, so many nodes may have requirements for transmitting data. Subsequently, when the device transmits data, there is a great probability of collision and mutual interferences.

Figure 4:
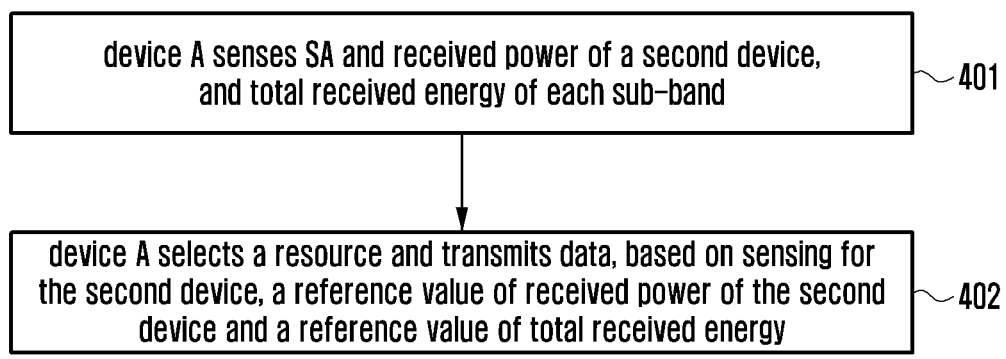
FIG. 4 is a flowchart illustrating how to sense a channel and select/re-select channel resources, in accordance with an embodiment of the present disclosure.

Assume that data transmission mechanism of the device is as follows, firstly, the device transmits a control channel. The control channel is configured to indicate information, such as time-frequency resource occupied by a data channel, modulation and coding scheme (MCS), which is referred to as scheduling assignment (SA). Subsequently, foregoing device transmits data in the scheduled data channel. For a LTE D2D/V2X system, foregoing SA is also referred to as PSCCH. The data channel is also referred to as PSSCH. In order to avoid collision and reduce mutual interferences among devices, FIG. 4 is a flowchart of the present disclosure.

In block 401, a device A may firstly sense SA of other devices, and total energy received by each subband within a resource pool of the device A.

One subband may include one or multiple consecutive PRBs. A data channel of a device may occupy one or multiple subbands within one subframe. After information of one SA is obtained by the device A via decoding, accurate information for occupying a channel by a device transmitting foregoing SA may be obtained. For a SA successfully decoded, the received power of such SA may be further measured, so as to assist resource selection/re-selection by using information of such received power. Here, since transmission power of SA and a data channel, which are transmitted by one sending device, is not independent of each other, e.g., when received power of SA is relatively stronger, received power of a data channel thereof is generally stronger, the received power of SA may reflect received power strength of a data channel of the device, which transmits the SA. To better support such function, when two sending devices transmit SA on the same PRB, that is, in a case where SA resources conflict, it is necessary to improve the probability for successfully receiving a SA, and improve measurement accuracy of the received power of the SA, which has been received successfully. Alternatively, for a SA successfully received, received power of DMRS of a data channel scheduled by the SA may be measured, based on a subband scheduled by the SA, so as to assist resource selection/re-selection, by using such information of the received power.

One kind of information used for assisting resource selection/re-selection is energy, which is received by each subband in the resource pool. Foregoing energy refers to the total energy received by one subband. That is, when multiple sending devices transmit signals on one subband, foregoing energy refers to the total energy of overlapped signals of the multiple sending devices. In a case where the device A does not receive SA, foregoing energy may still assist resource selection/re-selection. However, since the lack of necessary information about future resource occupation, performances of the device A are limited when selecting/re-selecting resources.

In block 402, the device A selects a resource, based on sensing for the other devices, a reference value of received power, and a reference value of total received energy.

Specifically, the device A may select the resource appropriate for data transmission, based on resource allocation information indicated by correctly decoded SA, received power of a corresponding device, and the total received energy measured by each subband in the resource pool of the device A. Here, processes for such successfully decoded SA may be further divided into several cases. For example, when received power of the correctly decoded SA is relatively stronger, a receiving device may determine that the device transmitting such SA is very close, thus a UE avoids occupying resources indicated by the SA. When received power of the correctly decoded SA is weaker, the receiving device may determine that the device transmitting such SA is far away. When there is no other appropriate resource, resources indicated by the SA may be available. In the present disclosure, specific methods for selecting and re-selecting resources are not limited.

On the basis of resource occupation of a data channel, which is determined by the correctly decoded SA, and received power of a corresponding sending device, for example, Reference Signal Receiving Power (RSRP), when the SA further indicates that current data channel resources are continuously occupied in the future, the device A explicitly learns resource occupation about the future subframe resource. The device A determines the reference value of received power of the device B after subframe n, based on a measurement value of received power of the device B within a sensing window, so as to avoid mutual interferences as much as possible. Assume that the device A determines the reference value of received energy on one subframe/subband after subframe n, based on some known or configured resource period occupation information, and energy received by each subband in the resource pool, so as to determine resource occupation about the future subframe resource, thereby avoiding mutual interferences as much as possible.

Embodiment 1

In a 3GPP D2D system, DMRS sequences of SA are fixed. When at least two devices transmit SA on the same resource, a device A may correctly receive SA of one device therein. For example, generally speaking, the SA with stronger received power may be correctly received. However, DMRS received by the device A is actually an overlapped signal of the at least two sending devices. A channel estimation obtained with DMRS is actually an overlapped channel of the at least two transmitting devices, which will affect decoding performance for information of one SA. In addition, the received power obtained based on DMRS measurement, which is referred to as RSRP in the following, is also RSRP of overlapped signals, and cannot truly reflect received power of one sending device with successful SA decoding. To solve such problem, one method is to define multiple DMRS sequences, such that various sending devices may use different DMRS sequences, thereby improving channel estimation accuracy and RSRP measurement accuracy. Since multiple DMRS sequences are defined, correspondingly, the receiving device may be requested to perform a blind detection on the actually used DMRS sequence.

In current LTE system, a root sequence of a DMRS sequence is determined by a Physical Uplink Shared Channel (PUSCH), based on a PCID. CS and OCC of DMRS are also determined by the PUSCH, based on a cell-specific hopping sequence and information indicated by uplink scheduling signaling. In a V2X system, multiple DMRS sequences are generated, based on some specific parameters.

The first parameter for generating a DMRS sequence is a sending device identity (SID). For example, the root sequence may be selected based on the SID. Subsequently, DMRS root sequences transmitted by various devices may be different. Furthermore, CS and OCC may be determined based on the SID. Alternatively, since there is a good correlation property among sequences, which are generated based on the same root sequence and different CSs, the same root sequence may be adopted by all the UEs, or UEs using the same SA resource pool. Such root sequence may be consistent with D2D, which is a DMRS root sequence of the LTE system determined by PCID 510. Alternatively, such root sequence may be obtained with another PCID, e.g., avoid using PCID adopted by other functions as much as possible, that is, an optional value may be 504~509 or 511. Thus, after determining a root sequence with PCID, CS and OCC may be determined with SID, so as to differentiate DMRS sequences adopted by different devices. Here, in order to reduce number of blind-detections performed by a receiving device on SA, a group of CS and OCC combination may be selected firstly. For example, only 4 groups of CS and OCC combinations are allowed. And then, number of blind-detections performed by a receiving UE on SA within one PRB is 4.

The second parameter for generating the DMRS sequence is a configured resource pool ID of a device. Foregoing resource pool ID may refer to a SA resource pool ID, or a resource pool ID of a data channel. Specifically, assume that SA resource pools of two devices are totally overlapped, or partially overlapped, and resource pool IDs of such SA resource in the two devices are different, the DMRS sequence may be generated by using the resource pool D. For example, the root sequence of DMRS is firstly determined, based on a certain PCID, such as, one of 504~509 or 511, and then, CS and OCC are determined with a resource pool index.

The third parameter for generating the DMRS sequence is a device type. In a V2X system, devices may be divided into at least three classes, that is, vehicle, pedestrian and RSU. Characteristics for transmitting data by devices of various types are different. Thus, vehicles, pedestrian and RSU may be identified with different indexes in sequence, which are referred to as a device type index, so as to determine a DMRS sequence based on the device type index. For example, the root sequence of DMRS is firstly determined, based on a certain PCID, such as, one of 504-509 or 511. And then, CS and OCC are determined with the device type index. By adopting such method, when SAs of sending devices of different types are transmitted within one RB, that is, collision occurs, probability for successfully receiving one SA may be improved, and accuracy for measuring RSRP may also be improved, thereby enhancing V2X performances in a case, where multiple device types exist simultaneously.

The fourth parameter for generating the DMRS sequence is a subframe index. Such subframe index may be a subframe index in a LTE subframe structure. Alternatively, such subframe index may be a sequential number of a subframe, which is occupied by a resource pool of a device. For example, the root sequence of DMRS is firstly determined, based on a certain PCID, such as one of 504~509 or 511. And then, CS and OCC are determined with foregoing subframe index.

The fifth parameter for generating the DMRS sequence is current transmission number of one transport block (TB). For example, the root sequence of DMRS is firstly determined, based on a certain PCID, such as one of 504~509 or 511. And then, CS and OCC are determined, by using current transmission number of one TB.

The sixth parameter for generating the DMRS sequence is priority. The priority here may refer to a device priority, e.g., different priorities are allocated to different device types, such as, vehicles, pedestrian and RSU. Alternatively, the priority here may refer to a service priority. That is, the priority is determined by a service characteristic. Thus, the DMRS sequence may be determined based on a priority index. For example, the root sequence of DMRS is firstly determined, based on a certain PCID, such as one of 504~509 or 511. And then, CS and OCC are determined with the priority index. By adopting such method, when SAs of sending devices with different priorities are transmitted within one RB, that is, collision occurs, probability for successfully receiving one SA is improved, and accuracy for measuring RSRP is also improved, thereby improving V2X performances in a case, where data with multiple different priorities is transmitted simultaneously. For example, when two devices with different priorities collide, the foregoing method has a probability of about 50% to improve performances for transmitting data with higher priority. For example, take into account that higher transmission power may be used when transmitting data with a higher priority, by adopting foregoing method, the probability for transmitting data with a higher probability is further increased.

Six parameters for generating the DMRS sequence have been described in the foregoing. Actually, the root sequence of DMRS, CS and OCC may be determined jointly, by using at least two of above parameters. Alternatively, the root sequence of DMRS is firstly determined, based on a certain PCID, such as one of 504~509 or 511. And then, CS and OCC are determined by using other parameters.

In addition, foregoing configured parameters of DMRS sequence may also be used for generating a scrambling code of a data portion of SA. Alternatively, the scrambling code may be determined, by jointly using at least two of foregoing parameters. For example, the root sequence of DMRS of a data channel is determined, based on a certain PCID, such as one of 504~509 or 511. And the scrambling code may be determined, by taking into account other parameters.

Alternatively, N DMRS sequences may be configured by using high-level signaling, such as, a broadcast channel. Still alternatively, N DMRS sequences are predefined. The root sequence, CS and OCC of foregoing N DMRS sequences are not limited by the present disclosure. When transmitting SA, a device may randomly select one DMRS sequence, which is used for current SA transmission. Number of blind-detections performed by a receiving device on SA may be controlled, by controlling size of N.

Embodiment 2

In a 3GPP D2D system, DMRS sequences of SA are fixed. When at least two devices transmit SA on the same resource, a device A may correctly receive SA of one device therein. However, DMRS received by the device A is actually an overlapped signal of at least two sending devices. RSRP obtained after measuring DMRS is also the RSRP of the overlapped signal, and cannot correctly reflect received power of a sending device with successful SA decoding.

Here, although the DMRS sequence received by the device A is not appropriate for measuring RSRP, a modulation symbol sequence of a data portion of the SA successfully decoded, which is transmitted by a device, may be restored, based on SA information successfully decoded by the device A. The restored sequence of data portion of the SA may be used for measuring received power of the SA. Specifically, for the SA information obtained after decoding, the device A repeats encoding process and mapping process of the SA, that is, adds Cyclic Redundancy Check (CRC), channel encoding, rate matching, modulation, and so on, so as to generate a modulation signal of a data portion of SA. Since sizes of information blocks transmitted by various devices are generally different, PRBs occupied by data channels are generally different, and MCSs used by data channels are generally different, that is, SA information of various devices are independent to some extent, power of modulation symbol of SA's data portion may be measured, based on modulation symbol sequence of SA restored by the device A. Foregoing sensing, which is based on SA's modulation symbol sequence restored by the device A, may be performed in a time domain. One method is to measure energy, based on the SA's modulation symbol sequence restored by the device A. The other method is to perform a Discrete Fourier Transform (DFT) on the SA's modulation symbol sequence restored by the device A, map to the SA's PRB, and perform an inverse DFT (IDFT) in the time domain, so as to measure energy with such transformed time-domain sequence. For above two time-domain measurement methods, the device A may also need to perform filtering before sensing the SA's energy, so as to only obtain a signal of a PRB occupied by the SA. Alternatively, the SA's modulation symbol sequence restored by the device A may also be sensed in a frequency domain. That is, energy is measured in the frequency domain with a sequence, which is obtained after performing the DFT on the SA's modulation symbol sequence restored by the device A.

Embodiment 3

In a V2X system, when obtaining information of one SA after decoding, the device A may further obtain received power of such SA, so as to assist resource selection/re-selection with such received power information. However, since number of PRBs occupied by the SA is relatively small, e.g., one PRB, measurement accuracy of received power thereof is relatively limited. One solution is to increase processing accuracy of received power, by using a data channel scheduled by such SA. The device A does not need to decode the data channel scheduled by such SA, but needs to measure RSRP by using DMRS of the data channel, so as to reduce sensing complexity of the device A.

The device A may perform a weighted averaging on first received power and second received power. The first received power is obtained after measuring with SA. The second received power is obtained after measuring with a data channel. Since transmitting power of SA and data channel are generally different, in order to perform the weighted averaging, indication information about power of the data channel may be added to the SA. For example, a difference between total transmission power of data channel and total transmission power of SA; or, a difference between an Energy Per Resource Element (EPRE) of a data channel and SA EPRE. Alternatively, in order to implement the weighted averaging, the difference between total transmission power of data channel and total transmission power of SA may be predefined, or configured by high-level signaling. Alternatively, a difference between EPRE of a data channel and SA EPRE may be predefined, or configured with high-level signaling.

Alternatively, the device A may also take received power RSRP measured with DMRS of a data channel as received power information, which corresponds to the device transmitting such SA. Thus, a power difference between SA and data channel is not necessary to be indicated. By adopting such method, scheduling information of other devices may be obtained, by using SA reception of the other devices. And then, the device selects/re-selects resources, by using RSRP of DMRS of scheduled data channels and other parameters. Since the number of PRB of DMRS of SA is generally greater than that of SA, measurement accuracy may be improved, and performance of a sensing-based mechanism is also enhanced. From another aspect, the sensing-based method for selecting/re-selecting resources is mainly to coordinate occupation of data channel resources of each device. The method is facilitated to be more reasonable, by using RSRP of DMRS of a data channel.

Embodiment 4

Assume that a device occupies a resource with a period P, and occupies resources of K subframes within one period, e.g., transmits data for K times within one period. That is, foregoing device is allocated with K resources, and each resource is allocated by taking period P as a period. For a device A, after correctly receiving SA of other devices, the device A determines a subband occupied by a data channel scheduled by the SA, based on information carried by the SA. And then, the device A determines whether the subband of the allocated data channel is continuously occupied within subsequent one or more periods. The design of SA may indicate whether current resource is continuously occupied at least in a next period, or, indicate whether current resource is continuously occupied in subsequent X periods. X is a predefined constant, a high-level configured value, or a dynamically indicated value. X is constant 1, or a value range of X is an integer between 1 and Xmax. Xmax is a constant greater than 1. In addition, since resources are released once being occupied by a device for a certain number of periods, the device A may be facilitated to determine resource occupations of other devices by using such property. For example, assume that the SA does not indicate the accurate timing for releasing resources, the device A may record continuously occupied number of one resource. When the number reaches $P_{max}$, the device A may consider that device B has released such resource.

For another device B, in some cases, the device A may miss a SA of the device B, the reason may be decoding error of the SA resulted from collision, and so on. Alternatively, due to half-duplex limitations, when the device B transmits the SA, the device A is executing a transmission operation, and cannot receive the SA. Within a sensing window [n–a, n–b], corresponding to one resource among foregoing K resources of the device B, assume that the device A does not receive foregoing one SA of the device B within a period, the device A may still process the resource based on other SA of the device B. Assume that the device A misses the last one or multiple SAs before the end of the sensing window, the device A may still determine resource occupation of the resource by the device B after subframe n, based on other SA of the device B.

In a first case, assume that one SA only indicates resources of one data channel currently scheduled, instead of indicating the other resources of foregoing K resources.

For a resource of foregoing K resources of the device B, assume that the device A does not correctly receive the SA scheduling the resource within a period of the device B, however, the device A has received the SA scheduling the resource within a previous period of the device B, and there is no other information indicating to release resource occupation of the device B, and then, the device A may sense received power of a data channel of the device B within current period, based on scheduling information of the SA received previously.

Assume that the device B occupies above K resources periodically, and number of periods for respectively occupying foregoing K resources are the same. That is, after one period of the device B, foregoing K resources are released simultaneously. For a resource of foregoing K resources of the device B, assume that the device A has missed the SA for scheduling the resource within one or multiple periods, the device A has received SAs for scheduling other resources among foregoing K resources of the device B within the one or multiple periods, when these SAs do not indicate to release resources, the device A may consider that the resource of the device B is not released. When these SAs further indicate number of periods for continuously occupying resources, the device A may determine the number of periods needing to occupy the resource by the device B. When these SAs indicate to release resources, the device A may determine that the resource of the unreceived SA of the device B is also released together. When the device A does not receive any SA within one or multiple periods of the device B, the device A may consider that K resources of the device B are not released, so as to avoid collision as much as possible. Alternatively, it may be considered that foregoing K resources are completely released, since the reason that the device A cannot sense SA of the device B may be greater distance between the two devices. Alternatively, assume that the previously received SA of the device B indicates number of period of resource reservation, the device A considers that the resources are stilled occupied by the device B, within the number of reserved period indicated by foregoing SA. When the number of reserved period indicated by the SA has been achieved, the device A considers that resources of the device B are released.

Figure 5:
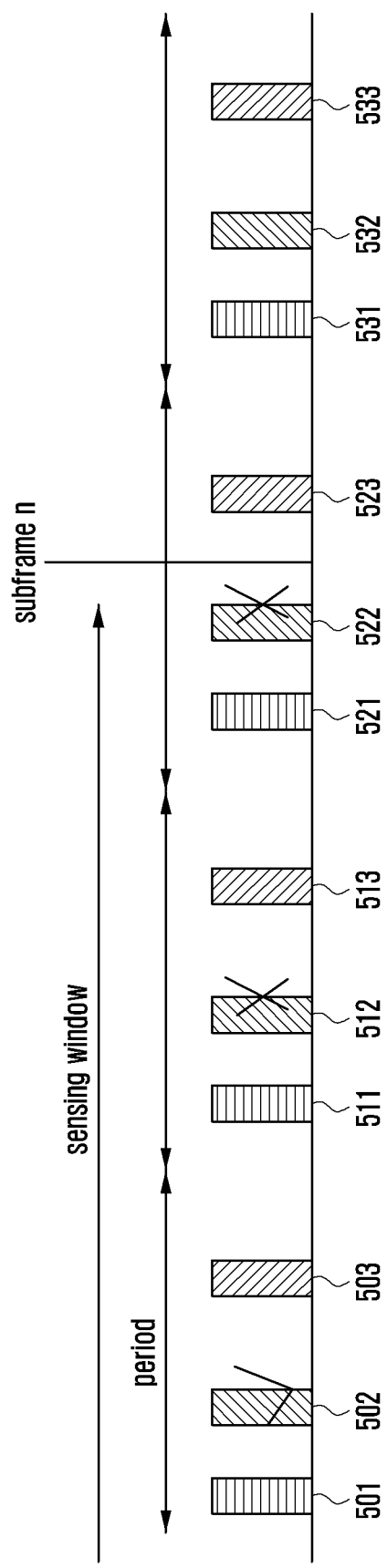
FIG. 5 is a schematic diagram illustrating how to process resource occupation based on another SA.

For a resource of the device B, although the device A has missed the SA for scheduling the resource within the last or several periods before the end of the sensing window, the device A received the SA for scheduling the resource of the device B previously, and there is no other information indicating to release resource occupation of the device B, the device A may consider that the device B still occupies the resource within a period after subframe n. As shown in FIG. 5, although the device A does not receive the SA for scheduling resources 512 and 522, since the device A received the SA for scheduling resource 502 previously, and there is no information about releasing resource, the device A considers that resource 532 is still occupied within a period of the device B after subframe n.

Assume that the device B occupies foregoing K resources periodically, and a number of period for respectively occupying foregoing K resources is the same. That is, after one period of the device B, foregoing K resources are released simultaneously. For a resource of foregoing K resources of the device B, when the device A has missed the SA for scheduling the resource within the last or several periods before the end of the sensing window, assume that the device A has received SAs for scheduling other resources among foregoing K resources of the device B, within the last or several periods, when these SAs do not indicate to release resources after subframe n, the device A may consider that the resource is not released by the device B after subframe n. When these SAs further indicate the number of period needing to continuously occupy resources, the device A may determine the number of period needing to occupy the resource by the device B after subframe n. When these SAs indicate to release resources, the device A may determine that the resource of the unreceived SA is also released by the device B. When the device A does not receive any SA within the last or several periods of the device B, the device A may consider that the K resources are continuously occupied by the device B after subframe n, so as to avoid collision as much as possible. Alternatively, it may be considered that foregoing K resources are completed released, since the reason that the device A cannot sense the SA of the device B is greater distance between the two devices. Still alternatively, assume that the previously received SA of the device B indicates a number of period of resource reservation, the device A may consider that the device B still occupies the resources within the number of reserved period indicated by the SA. When the number of reserved period indicated by the SA is achieved, the device A considers that resources of the device B are released.

In a second case, assume that one SA may schedule multiple resources among foregoing K resources, or schedule all the foregoing K resources, more particularly, when the SA does not carry the ID of the device B, however, one SA indicates initial-transmission resource and re-transmission resource(s) corresponding to one data, after receiving foregoing SA, the device A only learns that initial-transmission resource and re-transmission resource(s), which are occupied by one data scheduled by foregoing SA, come from the same device B. The foregoing number of re-transmission may be greater than, or equal to 1. In addition, for two SAs scheduling the initial transmission and re-transmission of the same data of the device B, assume that the SA does not carry the ID of the device B, even if the device A correctly receives these two SAs, the device A cannot definitely determine that the two received SAs come from the same device.

Within a period of the device B, even if the device A does not receive one SA of the device B, after correctly decoding other SA, the device A may still learn each resource occupied by the device B currently, whether these resources are continuously occupied in a subsequent period, and number of period needing to continuously occupy the resources. Subsequently, the device A may measure received power of a data channel of each resource, which is occupied by the device B. Alternatively, the device A may measure the received power of a data channel scheduled by such SA in a subframe where the correctly decoded SA is located. Still alternatively, each resource occupied by the device B may be obtained, based on the SA received within a previous period of the device B. Furthermore, assume that there is no other information indicating to release information, thus, the device A may measure the received power of a data channel of each resource, which is occupied by the device B within current period. When the device A does not receive any SA within one or several periods of the device B, the device A may consider that K resources of the device B are not released, so as to avoid collision as much as possible. Alternatively, the device A may also consider that foregoing K resources are completely released, since the reason that the device A cannot sense the SA of the device B may be greater distance between the two devices. Alternatively, assume that the previously received SA of the device B indicates the number of period of resource reservation, the device A may consider that the resources are still occupied by the device B within the number of reserved period, which is indicated by foregoing SA. When the number of reserved period indicated by the SA is achieved, the device A considers that the resources of the device B are released.

Assume that the device A has missed one or more SA within the last or multiple periods, before the end of the sensing window, however, the device A correctly receives other SAs within the last or multiple periods, and these SAs do not indicate to release resource after subframe n. Subsequently, the device A may consider that resources of the device B, indicated by the correctly received SA, are not released after subframe n. When the correctly received SA further indicates the number of period needing to continuously occupy the resources, the device A may determine the number of period needing to occupy the resource by the device B after the subframe. When these correctly received SAs indicate to release resources, the device A may determine that resource of the unreceived SA of the device B is released together. When the device A does not receive any SA within the last or multiple periods of the device B, the device A may consider that K resources of the device B are continuously occupied after subframe n, so as to avoid collision as much as possible. Alternatively, the device A may consider that foregoing K resources are completely released, since the reason that the device A cannot sense SA of the device B may be greater distance between the two devices. Alternatively, assume that the previously received SA of the device B indicates the number of period of resource reservation, the device A may consider that the resources of the device B are still occupied within the number of reserved period, which is indicated by foregoing SA. When the number of reserved period indicated by the SA is achieved, the device A considers that the resources of the device B are released.

Assume that the SA carries the ID of the device B, resources occupied by the device B within multiple periods may be identified with foregoing ID. These resources may be used for obtaining the received power of the device B; otherwise, assume that the SA does not carry the ID of the device B, when a SA indication corresponds to initial-transmission resource and re-transmission resource(s) of one data, after receiving the SA, the device A only learns that the initial-transmission resource and re-transmission resource(s) occupied by one data, which is scheduled by the SA, come from the same device B, so as to obtain the received power of the device B based on foregoing initial-transmission and/or re-transmission resource(s).

For another device B, in some cases, the device A may miss a data channel of a resource of the device B. The reason may be SA decoding error resulted from collision. Alternatively, the reason may be half-duplex limitations. When the device B transmits the data channel, the device A is performing transmission operations, and cannot receive the data channel. No matter whether the device A has received the SA of the device B, the device B cannot receive the data channel currently.

Figure 1:
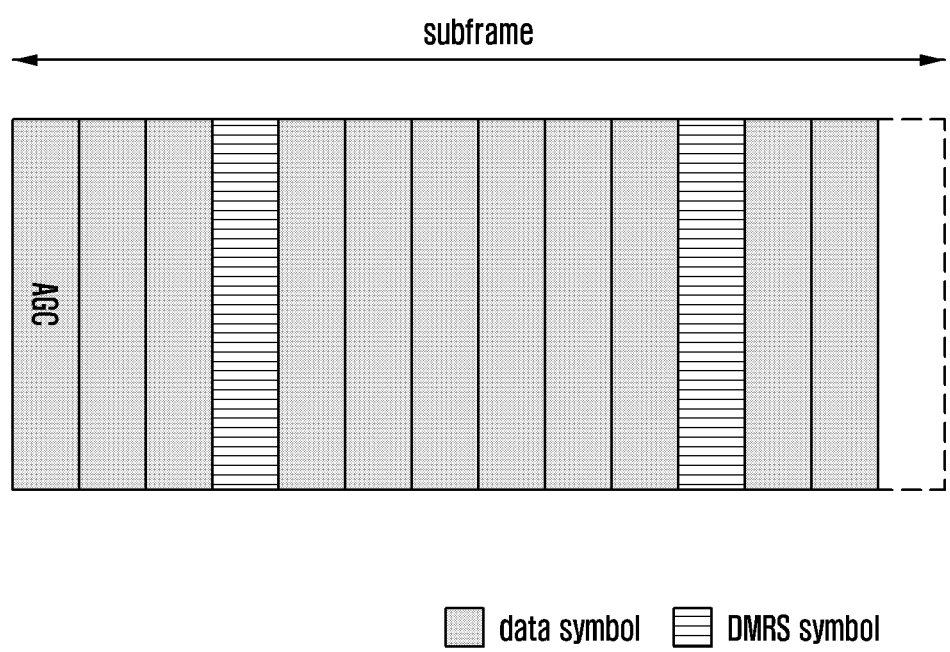
FIG. 1 is a schematic diagram illustrating an uplink subframe in an existing LTE system.
Figure 2:
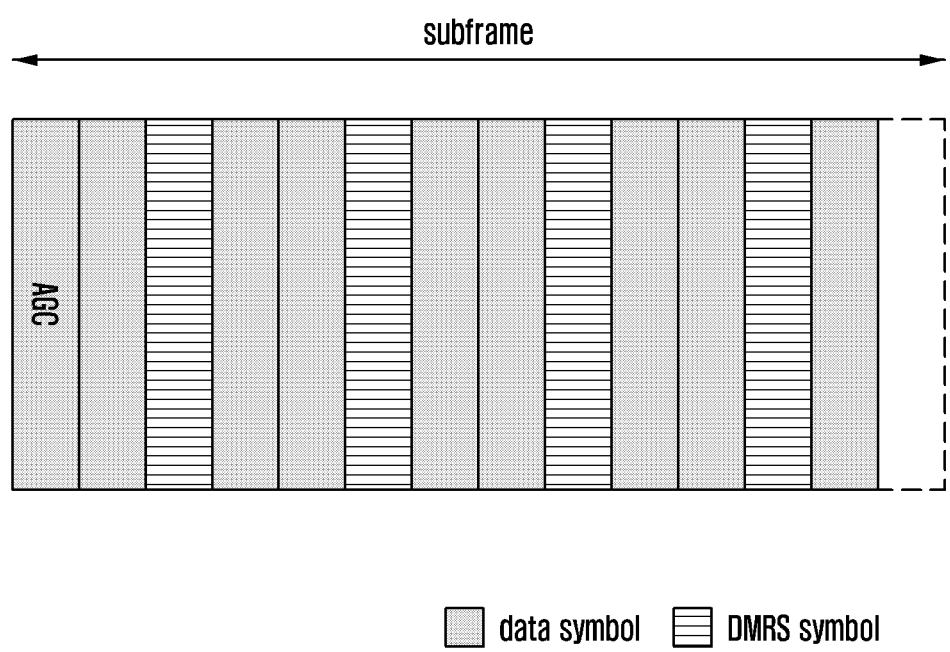
FIG. 2 is a schematic diagram illustrating an uplink subframe for transmitting a DMRS on 4 OFDM symbols.
Figure 3:
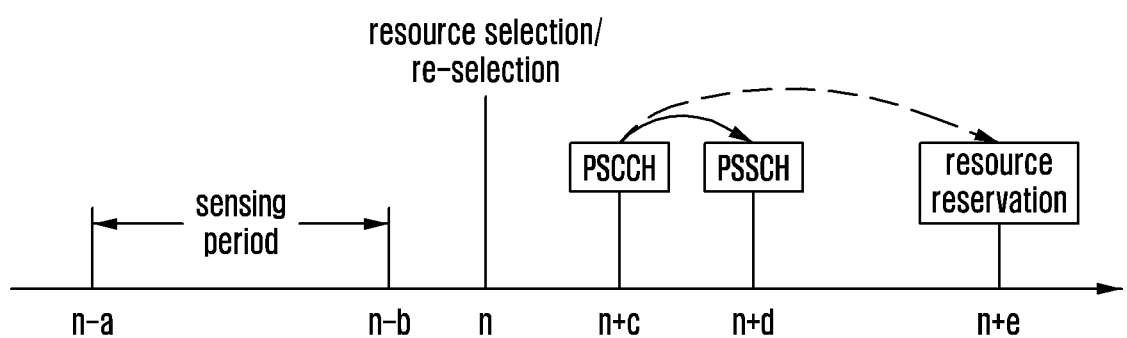
FIG. 3 is a schematic diagram illustrating how to select/re-select channel resources based on sensing.
Figure 10:
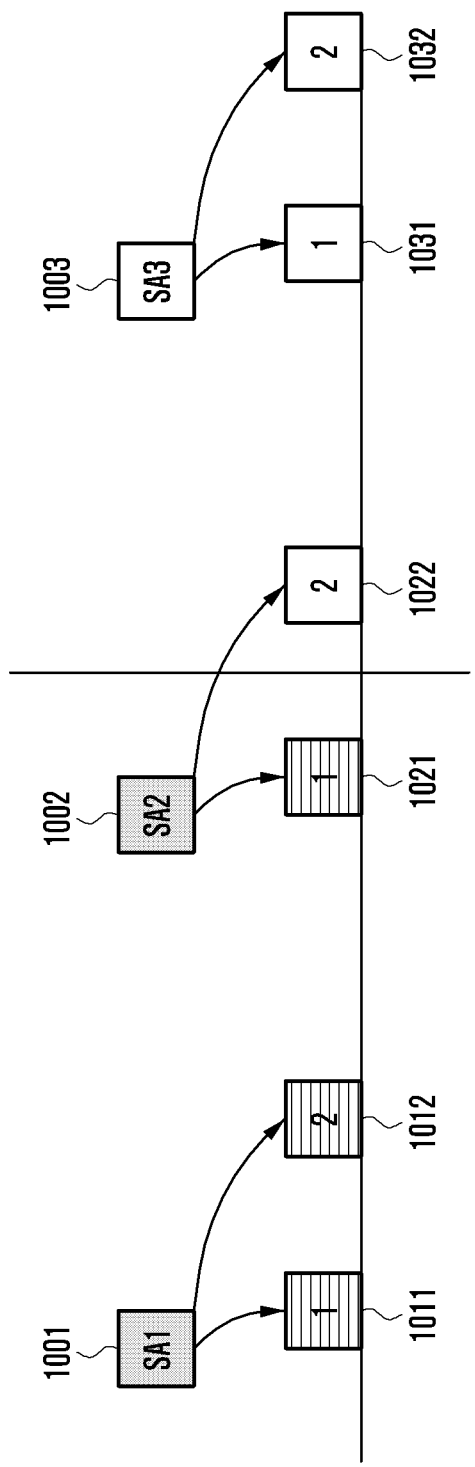
FIG. 10 is a schematic diagram illustrating how to process resource reservation, in accordance with an embodiment of the present disclosure.

In another case, where received power of a data channel of the device B cannot be measured, on the basis of resource selection/re-selection mechanism illustrated with FIG. 3, assume that the device A successfully receives a SA of the device B in a position, which is close to end position of a sensing window [n–a, n–b], that is, in a subframe close to subframe (n–b). However, a data channel scheduled by the SA is located after subframe (n–b). That is, the device A does not receive the data channel transmission of the device B within the sensing window, or it's too late for the device A to process the data channel transmission of the device B within the sensing window. Thus, it is not possible to measure the received power, based on DMRS of the data channel of the device B. For example, when one data of the device B has been transmitted multiple times, e.g., one initial-transmission and one re-transmission, a possible case may be as follows. The initial transmission is located in subframe (n–b), or before subframe (n–b). However, the re-transmission is located after subframe (n–b). As shown in FIG. 10, SA2 (1002) has scheduled the initial transmission (1021) and one re-transmission (1022) of one data. The initial transmission is located within the sensing window, and the re-transmission is located after subframe n. SA2 and the initial-transmission may be located within the same subframe, or different subframes. No matter whether a SA and a data channel scheduled by the SA are located within the same subframe, data re-transmission may be located after subframe (n−b). At this time, when a data channel scheduled by the SA of the device B is located after subframe (n−b), and meanwhile before subframe (n+p), influences of such transmission of the device B are not necessary to be considered by the device A, when selecting/re-selecting resources after subframe n. When the resource scheduled by foregoing SA of the device B are not released, that is, the device B will continuously occupy the resource at least within two periods. And then, when selecting/re-selecting resources, the device A may need to consider the influence, which is resulted from occupying the resource by the device B in a subsequent transmission period. More particularly, under the circumstances that foregoing SA indicates to continuously occupy current resource for a period, when selecting/re-selecting resources, the device A may consider the influence of resource occupation of the device B within the period. Under the circumstances that a data channel scheduled by the SA of the device B is located within the subframe (n+p), or after subframe (n+p), when selecting/re-selecting resources after subframe n, the device A may consider influences of resource occupation of the device B for this time, and influences of resource occupation of the device B in subsequent periods. More particularly, under the circumstances that foregoing SA indicates to continuously occupy current resource for one period, when selecting/re-selecting resources, the device A may consider influences of resource occupation of the device B within two continuous periods. Here, p represents the minimum subframe number, which is between subframe n and a subframe available for data transmission by the device A. The device A selects/re-selects a resource within subframe n. p is mainly limited by processing time of a device. p may be a pre-defined constant, or may be a value configured by a high level. The reason is as follows. After selecting a resource in subframe n, the device A may wait for a certain processing time to transmit SA. Besides, a certain subframe interval may exist between a first subframe and a second subframe, depending on high-level configurations or dynamic processing of the device A. The SA is transmitted in the first subframe. The data channel is transmitted in the second subframe.

In a case where one resource of the device B is missed by the device A, within the sensing window [n−a, n−b], corresponding to a resource of foregoing K resources of the device B, assume that the device A does not receive the data channel of the resource within one period of the device B, the device A may still estimate the received power of the device B on the resource with another method.

The first method is as follows. Assume that the device A has received data transmission of foregoing resource within another period of the device B, the device A may obtain the received power within such period, based on the received power of data transmission measured within foregoing another period.

The second method is as follows. Assume that the device A has received a data channel of the device B, which is transmitted on other resources, that is, the device A has measured the received power of a data channel of other resources. And then, the received power of the device B on such resource may be obtained, based on the received power measured for other resources of the device B. For example, assume that the SA does not carry the ID of the device B, however one SA indication corresponds to initial-transmission resource and re-transmission resource(s) of one data, the received power on such resource may be obtained, based on received power measured for other resource(s) of such data, which is indicated by foregoing SA. Specifically, assume that the initial-transmission resource and re-transmission resource(s) scheduled by one SA are both located in subframe (n−b), or before subframe (n−b), when the device A does not measure the received power of a resource, the device A may obtain the received power on the resource, based on received power measured for other resources indicated by foregoing SA. Assume that at least one re-transmission resource scheduled by one SA is located after subframe (n−b), the received power of re-transmission resource after subframe (n−b) is obtained, based on received power measured for a resource located within subframe (n−b), or before subframe (n−b) indicated by foregoing SA.

The third method is to measure the received power of the device B, based on the SA of the device B.

The fourth method is to directly configure the received power of the device B, in such case, to be a value, e.g., a great value, to enable the resource of the device B is un-available to the device A after subframe n, so as to avoid collision.

The fifth method is as follows. When foregoing one resource of current period is not used for obtaining a reference value of received power of the device B, which is after subframe n, it is not necessary to focus on the received power of foregoing one resource within current period.

When it is necessary to obtain the reference value of received power of the device B after subframe n, the foregoing fifth method may be adopted. That is, the device A only obtains the reference value of the received power of the device B after subframe n, based on received power measured for data transmission of the device B, which is received by the device A. Alternatively, for the not received data transmission of the device B, a first measurement value of received power is obtained with foregoing first to third methods. The reference value of received power of the device B after subframe n is jointly determined, based on the first measurement value of received power and a second measurement value of received power. The second measurement value of received power is obtained, by measuring the received data transmission of the device B. The received power obtained with foregoing first to third methods is denoted with P. P is used to calculate the reference value of received power after subframe n. Alternatively, an offset Δ may be further introduced. Subsequently, P+Δ is used to calculate the reference value of received power after subframe n. Δ is a predefined constant, a high-level configured value, or a dynamically indicated value. By configuring a greater Δ, collision may be avoided as much as possible. Alternatively, when the device A does not receive any data transmission of the device B within the sensing window, the measurement value of received power may be obtained, by adopting foregoing third or fourth method. And then, the reference value of received power after subframe n may be further obtained.

More particularly, even if the SA of the device B has scheduled two transmissions for one data, the device B may transmit data only once, or even not transmit the data. The reason is that the device B may need to perform other operations with higher priorities on a subframe, which needs to transmit data. For example, power of the device B is limited, and the device B needs to firstly guarantee power of an uplink transmission in a cellular network. Since the SA does not carry the ID of the device B, assume that the device A has received one SA of the device B, the device A cannot definitely determine whether another SA scheduling the same data of the device B has been received. Thus, after correctly receiving one SA, the device A measures received power of a data channel, which is scheduled in the subframe where the SA is located. The device A may take the received power as received power of other data channel(s), which is/are scheduled by the SA. Correspondingly, the device A needs to process resource reservation for a data channel of K-time data transmissions, which are scheduled by the SA, based on one received SA and received power of foregoing data channel. That is, when the received power of foregoing data channel exceeds a certain threshold, the device A needs to avoid occupying corresponding resources and corresponding reserved resources of the device B.

Assume that the SA does not carry the ID of the device B, one SA indication corresponds to initial-transmission resource and re-transmission resource(s) of one data, and only indicates to release resources and to continuously occupy resources in a next period. After receiving a SA of the device B, the device A may respectively process resource reservation, based on initial-transmission resource and re-transmission resource(s) scheduled by the SA. That is, when received power of foregoing initial-transmission resource and/or re-transmission resource(s) exceeds a certain threshold, the device A needs to avoid occupying corresponding resources of the device B. For a SA, when a resource scheduled by the SA is located after subframe n, resource reservation may not be processed on the resource. Alternatively, the received power on the resource may be obtained, by using foregoing method in the present disclosure, and then the resource reservation is processed.

As shown in FIG. 10, since the SA does not carry the device ID, the device A cannot determine whether SA1 (1001) and SA2 (1002) received within the sensing window come from the same device. The SA and a data channel scheduled by the SA may be located within the same subframe, or in different subframes.

Assume that SA1 indicates to continuously occupy the resource in a next period, corresponding to the first data channel (1011) scheduled by SA1, resource (1021) of the first data channel in a next period is still located within the sensing window. Besides, there is no other information indicating to continuously occupy the first data channel scheduled by SA1 after subframe n. Thus, the resource reservation after subframe n is not affected by the first data channel, which is scheduled by SA1. Corresponding to the second data channel (1012) scheduled by SA1, resource (1022) of the second data channel in a next period is located after subframe n, the resource reservation is processed, based on the second data channel scheduled by SA1. That is, when received power of the second data channel scheduled by SA1 exceeds a certain threshold, the device A needs to avoid occupying the second data channel scheduled by SA1.

For SA2, the first data channel (1021) scheduled by SA2 is located within the sensing window, while the second data channel (1022) scheduled by SA2 is located after subframe n. Corresponding to the first data channel scheduled by SA2, assume that SA2 indicates to continuously occupy the resource, that is, resource 1031, in a next period, the resource reservation may be processed, based on the first data channel scheduled by SA2. That is, when received power of the first data channel scheduled by SA2 exceeds a certain threshold, the device A needs to avoid occupying the first data channel scheduled by SA2.

For the second data channel scheduled by SA2, since the second data channel scheduled by SA2 is located after the sensing window, that is, the received power has not been measured practically, resource reservation may be not processed for the second data channel scheduled by SA2. Here, although the device A cannot determine that SA1 and SA2 come from the same device, when SA1 and SA2 indicate the same resource, SA1 and SA2 may come from the same interference device. That is, resource reservation of the device has already been processed, based on the second data channel of SA1. That is, influences of this interference device have already been considered. However, a case may still exist, where SA1 and SA2 come from two different interference devices. At this time, by adopting the method, collision with an interference device transmitting SA2 cannot be completely avoided.

Alternatively, for the second data channel scheduled by SA2, although the second data channel scheduled by SA2 has not been measured practically, the received power of the second data channel scheduled by SA2 may still be obtained, based on foregoing method in the present disclosure. And then, resource reservation is processed. That is, when received power of the second data channel scheduled by SA2 exceeds a certain threshold, the device A needs to avoid occupying the second data channel scheduled by SA2. By adopting the method, when SA1 and SA2 received by the device A actually come from different interference devices, it is guaranteed that resource reservation has been processed for all the interference devices after subframe n. When SA1 and SA2 actually come from the same interference device, resource reservation has been processed two times for the re-transmission resource(s) of the interference device. No adverse effect has been generated by the repeated resource reservation for avoiding collision among devices. Furthermore, assume that SA2 indicates to continuously occupy the resource in a next period, that is, the second data channel (1022) scheduled by SA2 is continuously occupied in the next period, that is, resource 1032. Thus, when processing resource reservation, influences of resources 1022 and 1032 are both considered.

Figure 11:
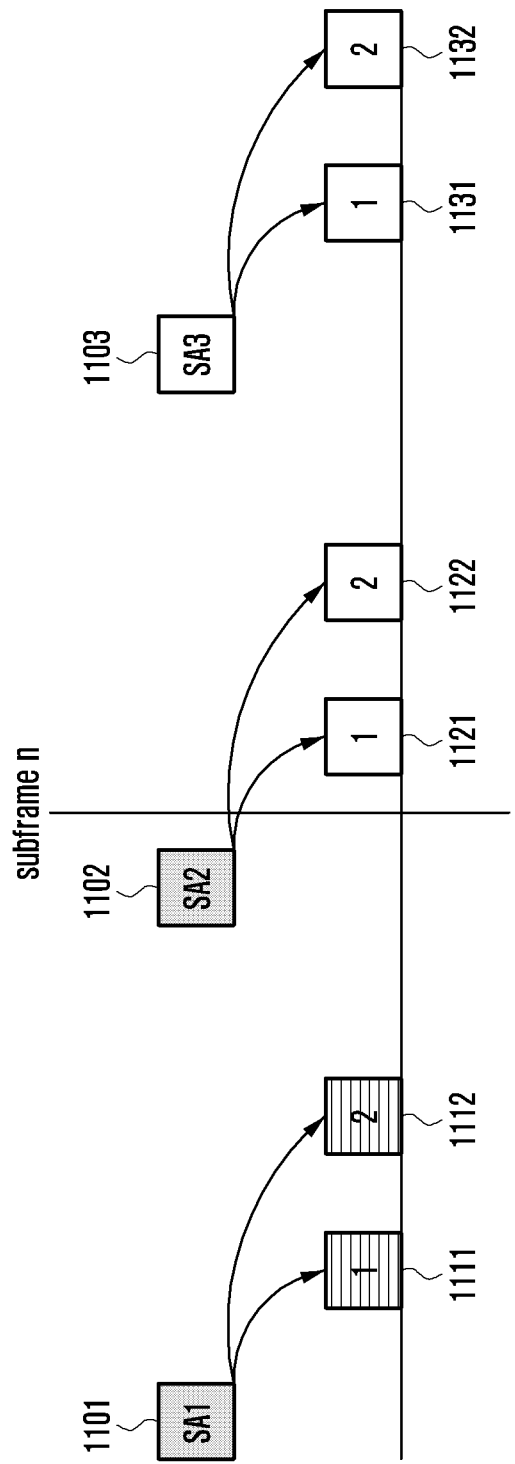
FIG. 11 is another schematic diagram illustrating how to process resource reservation, in accordance with an embodiment of the present disclosure.

As shown in FIG. 11, assume that SA and a data channel scheduled by the SA are not located within the same subframe, since the SA does not carry the device ID, the device A cannot determine whether SA1 (1101) and SA2 (1102), which are received within the sensing window, come from the same device.

Assume that SA1 indicates to continuously occupy the resource in a next period, corresponding to two data channels (1111 and 1112) scheduled by SA1, resources (1121 and 1122) of the two data channels (1111 and 1112) in the next period are located after subframe n. Resource reservation may be respectively processed, based on the two data channels scheduled by SA1. That is, when received power of a data channel exceeds a certain threshold, the device A needs to avoid occupying the data channel.

For SA2, two data channels (1121 and 1122) scheduled by SA2 are located after the sensing window. That is, the received power has not been measured practically. Thus, resource reservation may be not processed for the second data channel scheduled by SA2. Here, when SA1 and SA2 come from the same device, resource reservation of the device has already been processed, based on two data channels of SA1. When SA1 and SA2 come from two different interference devices, by adopting the method, collision with an interference device transmitting SA2 cannot be completely avoided. Alternatively, although two data channels scheduled by SA2 are not practically measured, received power of the two data channels scheduled by SA2 may still be obtained, based on foregoing method in the present disclosure. For example, the received power is measured based on SA2, and then, resource reservation is processed. That is, when received power of a data channel exceeds a certain threshold, the device A needs to avoid occupying the data channel. By adopting the method, when SA1 and SA2 come from different interference devices, it is guaranteed that resource reservation has been processed for all the interference devices after subframe n. When SA1 and SA2 actually come from the same interference device, resource reservation is processed two times for the re-transmission resource(s) of the interference device. No adverse effect has been generated by the repeated resource reservation for avoiding collisions among devices. Furthermore, assume that SA2 indicates to continuously occupy the resource in a next period, that is, two data channels scheduled by SA2 are continuously occupied in the next period, that is, resources 1131 and 1132. Thus, when processing the resource reservation, not only influences of resources 1121 and 1122 are considered, but also influences of resources 1131 and 1132 are considered.

Embodiment 5

For a device, since data of the device may be generated periodically, this device needs to occupy resources periodically. Besides, each data may be transmitted K times repeatedly, K is greater than, or equal to 1, so as to avoid the following scene, where some devices cannot receive data due to half-duplex limitations. Correspondingly, for foregoing device, the device needs to occupy resources with period P, and occupy resources of K subframes within one period. Alternatively, K resources are allocated for foregoing device, and each resource is allocated with period P. For a device, after selecting and occupying a certain resource for several periods, the device will release the resource, and re-select resources. Objectives of foregoing operations are to avoid generating collisions continuously, when adjacent devices select the same resources. When selecting/re-selecting resources each time, a number of period C for continuously occupying the same resource may be randomly generated within $[P_{min}, P_{max}]$. And then, resources available for being occupied continuously within C periods may be selected. $P_{min}$ and $P_{max}$ are predefined constants, or configured values, e.g., respectively equal to 5 and 15. And then, once a data is transmitted, minus one from the resource re-selection counter of number of period. Re-select resources, when a resource re-selection counter is zero.

In addition, depending on information carried by the SA, the SA may carry indication information, which indicates whether to continuously occupy currently allocated subframe/subband within a next period or multiple periods. When such indication information does not exist, the device A may fixedly consider that the subframe/subband currently allocated for the device B is continuously occupied in a next period. By adopting the foregoing method, possible collisions may be avoided. However, when current device B actually releases the resource in a next subframe, resource selection/re-selection cannot be performed by fully utilizing all the resources. Alternatively, the device A may record a number of period for the device B to occupy the same resource. When sensing that number for the device B continuously occupying the resource reaches $P_{max}$, the device A may consider that the device B definitely releases the resource. Generally speaking, assume that the device A receives the SA of the device B, and the resource allocated by the SA is not released after subframe n, the device A performs subsequent processes, by taking into account that the device B continuously occupies the resource after sub-frame n. For resource occupation of foregoing un-released resource of the device B, power of a received signal of the device B may be measured. For example, a reference value of received power of the device B after subframe n may be estimated, based on RSRP measured with DMRS. When the reference value of the received power exceeds a certain threshold, the device A needs to avoid occupying the resource of the device B.

Based on the resource selection/re-selection mechanism shown in FIG. 3, the device A selects/re-selects resources within subframe n. Based on a sensing result within a subframe range [n−a, n−b], the subframe range [n−a, n−b] is referred to as the sensing window in the following, the device A may determine resource occupation after subframe n, so as to select/re-select an appropriate SA and a data channel resource. Within the sensing window, the device B generally transmits data within multiple periods, and transmits the same data for multiple times within one period. Correspondingly, the device A has made multiple measurements for the device B within the sensing window of the device A. For one measurement, received power of all the subbands occupied by the device B may be averaged, so as to obtain an average measurement value. Alternatively, the received power of the device B may be measured on resources occupied by the device B, by taking subband as granularity. Assume that the resource allocated by the SA of the device B is not released after subframe n, the reference value of received power on resources occupied by the device B after subframe n may be determined, based on multiple measurement values for foregoing received power of the device B, so as to determine whether resources occupied by the device B are available for transmissions of the device A. For example, foregoing reference value of received power may refer to received power of one subband, or received power of one PRB, or received power of one subcarrier. Based on the method in the fourth embodiment, assume that the device A does not receive a transmission on a resource of the device B, and the device A may adopt some methods to estimate received power of the transmission, the estimated received power may participate in calculating the reference value of received power. Alternatively, the foregoing un-received transmission of the device B may not be considered, the reference value of received power is only calculated, by using measurement value of received power of the device B's data transmission received by the device A.

Assume that the SA carries the ID of the device B, resources occupied by the device B within multiple periods may be identified based on foregoing ID. These resources may be used for obtaining the reference value of received power of the device B after subframe n; otherwise, assume that the SA does not carry the ID of the device B, when a SA indication corresponds to initial-transmission resource and re-transmission resource(s) of a data, after receiving foregoing SA, the device A only learns that the initial-transmission resource and re-transmission resource(s), which are occupied by the data scheduled by foregoing SA, come from the same device B. Subsequently, the device A may obtain the reference value of received power of the device B after subframe n, based on foregoing initial-transmission resource and re-transmission resource(s). In addition, for two SAs respectively scheduling initial-transmission and re-transmission of one data of the device B, assume that the SA does not carry the ID of the device B, even if the device A has correctly received these two SAs, the device A still cannot completely determine whether the received two SAs come from the same device.

Here, within the sensing window, the device A may sense resource occupation of the device B within C1 periods, and foregoing resource occupation is released within the sensing window. Meanwhile, the device A also senses resource occupation of the device B within C2 periods, and the resource occupation is not released within the sensing window. Thus, when determining the reference value of received power of the device B after subframe n, it may not differentiate whether resources have been released. That is, the reference value of received power may be calculated, by using all the measurement values of received power of the device B within the sensing window. Alternatively, the reference value of received power may be calculated, by using measurement values of received power on the un-released resources of the device B within the sensing window.

For a V2X system, a device participating in communications may be moved at high speed. For example, for two devices with relative movement speed 180 km/h, the relative position thereof may vary 50 meters within one second, which may bring about greater change to the received power of DMRS. That is, because of high-speed movement, current situation of the device B may be truly reflected by measurement value of received power of the device B, which is obtained in an adjacent subframe n.

In the present disclosure, a method for determining reference value $P_{ref}$ of received power on a resource allocated for the device B, which is located after subframe n, will be described in the following.

Figure 6:
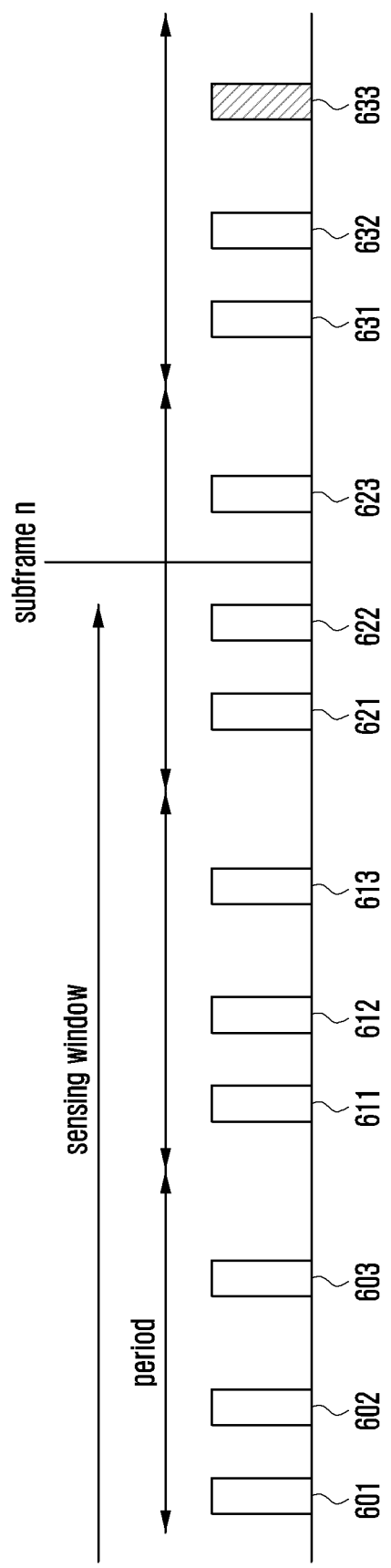
FIG. 6 is a schematic diagram illustrating a first method for obtaining a reference value of received power, in accordance with an embodiment of the present disclosure.

The first method for determining the reference value of received power is as follows. A reference value $P_{ref}$ of received power of the device B may be determined after subframe n. $P_{ref}$ is configured to estimate received power of each resource occupation of the device B after subframe n. As shown in FIG. 6, measurement values 601~603, 611~613, 621 and 622 of received power within the sensing window may be used for obtaining the reference value of received power, which is after subframe n. Besides, the foregoing reference value of received power is used for predicting resource occupation 623 and 631~633 of the device after subframe n.

The reference value $P_{ref}$ of received power may be equal to the last measurement value of received power of the device B, which is obtained within the sensing window. For example, assume that the SA does not carry the ID of the device B, when one SA indication corresponds to initial-transmission resource and re-transmission resource(s) of one data, the device A may obtain $P_{ref}$, based on the actually measured measurement value of received power on the last resource, which is among initial-transmission resource and re-transmission resource(s) scheduled by foregoing SA.

For example, as shown in FIG. 6, the reference value of received power after subframe n may be obtained, based on measurement value 622 of received power. Here, since each data of the device B may be transmitted for multiple times repeatedly, and a subband occupied by each transmission may be different, a first subband may be different from a second subband. The foregoing measurement value of received power, which is used for determining the reference value of received power for the second subband occupied by the device B after subframe n, is measured on the first subband.

Alternatively, $P_{ref}$ may be equal to an average value of measurement values of received power about the device B, within the sensing window. Alternatively, $P_{ref}$ may be equal to a weighted average value of measurement values of received power about the device B, within the sensing window. Since received power of the device B may vary rapidly, for a measurement value of received power of the device B, weight of an adjacent subframe n is greater.

Alternatively, $P_{ref}$ may be equal to a sliding average value of measurement values of received power, which is performed on the device B within the sensing window. For example, within the sensing window, when obtaining measurement value PB of the $i^{th}$ received power of the device B, the reference value of received power is updated to $P_{ref}(i)=c \cdot P_{ref}(i-1)+(1-c) \cdot P_B$. c is a predefined value, or a high-level configured value, or a dynamically adjusted value. $P_{ref}(i-1)$ is the reference value of received power, which is obtained by the device B in a previous measurement. Here, since each data of the device B may be repeatedly transmitted for multiple times, and a subband occupied by each transmission may be different, foregoing measurement values of received power of the device, which are used for performing averaging, weighted averaging, or sliding averaging, may be obtained after measuring different subbands. In the foregoing method, the measurement value of received power of the device B may be an average value of received power on all the subbands, which are occupied by the device B within current subframe.

Figure 7:
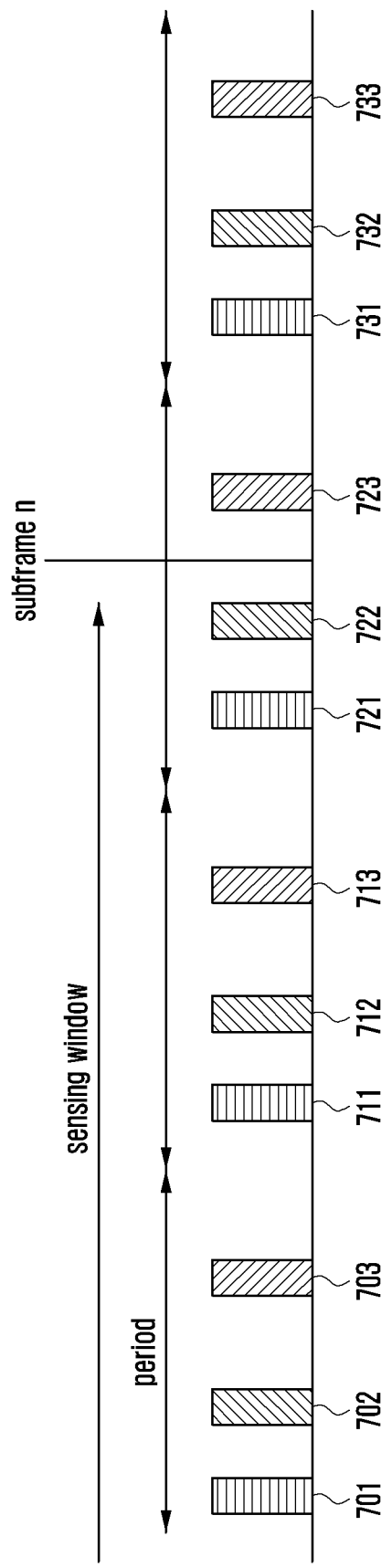
FIG. 7 is a schematic diagram illustrating a second method for obtaining a reference value of received power, in accordance with an embodiment of the present disclosure.

Since resource occupation of the device B is periodic, and K resources may be occupied within each period, K is greater than, or equal to 1, that is, the device B occupies K resources, and each resource is occupied periodically. The second method for determining the reference value of received power is as follows. Corresponding to foregoing K resources of the device B, when the K resources are not released after subframe n, the reference value of received power for foregoing K resources may be respectively determined, that is, K reference values of received power may be obtained at most. Specifically, for the $k^{th}$ resource of the device B, when the $k^{th}$ resource of the device B is located after subframe n, the reference value $P_{ref,k}$ of received power on the $k^{th}$ resource of the device B may be obtained, based on measurement value of received power on $k^{th}$ resource within each period of the sensing window. As shown in FIG. 7, assume that the device occupies three resources within each period, reference value of received power transmitted on resources 723 and 733 may be obtained, based on measurement values of resources 703 and 713. Reference value of received power transmitted on resource 731 may be obtained, based on measurement values of resources 701, 711 and 721. Reference value of received power transmitted on resource 732 may be obtained, based on measurement value of resources 702, 712 and 722.

Reference value $P_{ref,k}$ of received power may be equal to a measurement value for the last received power of the device B, which corresponds to foregoing $k^{th}$ resource within the sensing window. For example, assume that the SA does not carry the ID of the device B, when a SA indication corresponds to initial-transmission resource and re-transmission resource(s) of a data, the device A may obtain $P_{ref,k}$, based on the measurement value of received power on $k^{th}$ resource scheduled by foregoing SA. For example, as shown in FIG. 7, reference values of received power transmitted on resources 723 and 733 may be obtained, based on measurement value of resource 713. Reference value of received power transmitted on resource 731 may be obtained, based on measurement value of resource 721. Reference value of received power transmitted on resource 732 may be obtained, based on measurement value of resource 722. Alternatively, $P_{ref,k}$ is equal to an average value of measurement values of received power, which correspond to $k^{th}$ resource of the device B within the sensing window. Alternatively, $P_{ref,k}$ may be equal to a weighted average value of measurement values of received power, which correspond to the $k^{th}$ resource of the device B within the sensing window. Since the received power of the device B may vary rapidly, for a measurement value of received power of the device B, weight of an adjacent subframe n is greater. Alternatively, $P_{ref,k}$ may be equal to a sliding average value of measurement values of received power, which correspond to foregoing $k^{th}$ resource of the device B within the sensing window. For example, within the sensing window, when obtaining measurement value PB of the $i^{th}$ received power on foregoing $k^{th}$ resource of the device B, the reference value of received power is updated to $P_{ref,k}(i)=c \cdot P_{ref,k}(i-1)+(1-c) \cdot P_B$. c is a predefined value, or a high-level configured value, or a dynamically adjusted value. $P_{ref,k}(i-1)$ is a reference value of received power on the $k^{th}$ resource of the device B, which is obtained in a previous measurement. Based on the foregoing method, since resource occupation of the device B is periodic, when calculating reference value $P_{ref,k}$ of received power, the adopted measurement values of received power of the device B are measured on the same subband, so as to reflect received power of the device B on these subbands more accurately. In the foregoing method, foregoing measurement value of received power of the device B may be an average value of received power, which is received on all the subbands occupied by the device B within current subframe. Alternatively, foregoing measurement value of received power of the device B may be received power of the device B, which is measured on resources occupied by the device B within current subframe, by taking subband as granularity.

Assume that subbands of K resources occupied by the device B within one period may be the same, or partially the same, correspondingly, on the same subband, the device A may measure received power of multiple resources of the device B within one period. Alternatively, within the sensing window, the device A senses some resource occupations of the device B, and these resources are not released after subframe n. Besides, the device A also senses other resource occupations of the device B, and these resources have already been released. Subbands of foregoing un-released resources and released resources may be the same, or partially the same. The third method for determining the reference value of received power is as follows. For the $k^{th}$ resource of the device B, the $k^{th}$ resource is not released. Based on the subband occupied by the $k^{th}$ resource of the device B, the reference value of received power on the $k^{th}$ resource of the device B may be obtained, based on a measurement value of received power in a subframe, which transmits data of the device B on the same subband within the sensing window.

Figure 8:
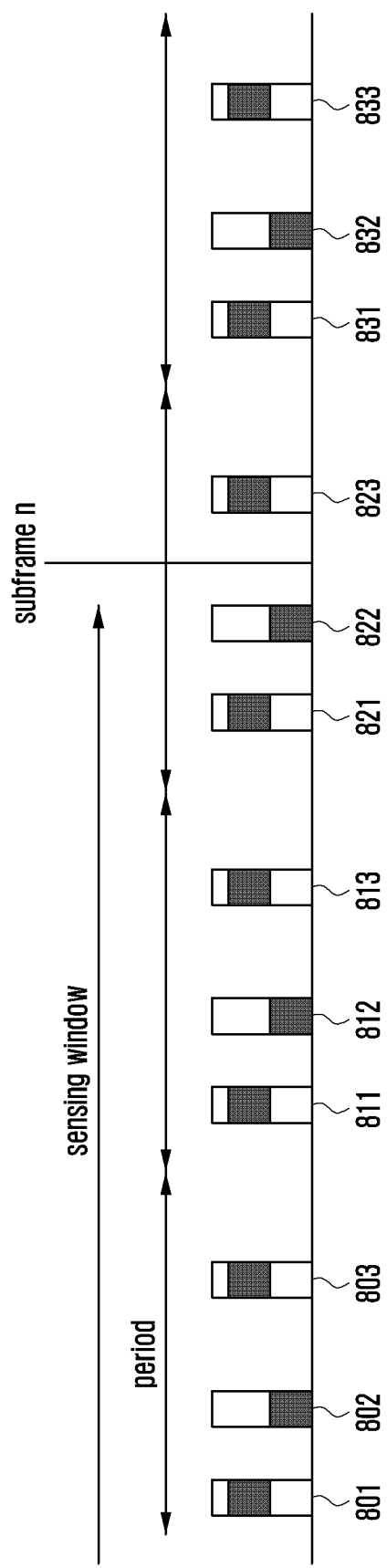
FIG. 8 is a schematic diagram illustrating a third method for obtaining a reference value of received power, in accordance with an embodiment of the present disclosure.

Assume that subbands occupied by the $i^{th}$ resource and the $j^{th}$ resource of the device B within a period are the same, reference values of received power of the $i^{th}$ resource and $j^{th}$ resource after subframe n may be obtained, by using a first measurement value of received power and a second measurement value of received power within the sensing window. The first measurement value of received power corresponds to the $i^{th}$ resource within the sensing window. The second measurement value of received power corresponds to the $j^{th}$ resource within the sensing window. As shown in FIG. 8, assume that the device occupies 3 resources within each period, and subbands occupied by the first and third resources are the same, reference values of received power transmitted on resources 823, 831 and 833 may be obtained, based on measurement values of resources 801, 803, 811, 813 and 821. The reference value of received power transmitted on resource 832 may be obtained, based on measurement values of resources 802, 812 and 822. Alternatively, within the sensing window, assume that subbands of foregoing un-released resources and released resources are the same, or partially the same, the reference value of received power of the device B after subframe n may be obtained, based on measurement values of received power on the same subband of foregoing un-released and released resources. Assume that the reference value of received power is determined by taking subband as granularity, and one resource of the device B includes multiple subbands, since subbands of different resources of the device B may be partially overlapped, when determining the reference value of received power of different subbands, the adopted measurement values of received power may come from different subframe positions within the sensing window.

For the $k^{th}$ resource of the device B, based on the subband occupied by the $k^{th}$ resource of the device B, a position of a subframe lastly transmitted by the device B on foregoing subband within the sensing window is determined. Thus, the reference value $P_{ref,k}$ of received power may be equal to a measurement value of received power, which is about the device B on foregoing subband within foregoing subframe. For example, as shown in FIG. 8, reference values of received power transmitted on resources 823, 831 and 833 may be obtained, based on measurement value of resource 821. The reference value of received power transmitted on resource 832 may be obtained, based on the measurement value of resource 822. Alternatively, for the $k^{th}$ resource of the device B, based on the subband occupied by the $k^{th}$ resource of the device B, a position of a subframe transmitted on foregoing subband by the device B within the sensing window is determined. Thus, $P_{ref,k}$ may be equal to an average value of measurement values of received power, which are about the device B on foregoing subband within the sensing window. Alternatively, $P_{ref,k}$ may be equal to a weighted average value of measurement values of received power, which are about the device B on foregoing subband within the sensing window. Alternatively, $P_{ref,k}$ may be equal to a sliding average value of measurement values of received power, which are about the device B on foregoing subband within the sensing window. For example, within the sensing window, when obtaining measurement value PB of the $i^{th}$ received power on a subband of foregoing K resources of the device B, the reference value of received power is updated to $P_{ref,k}(i)=c \cdot P_{ref,k}(i-1)+(1-c) \cdot P_B$. In the formula, c is a predefined value, or a high-level configured value, or a dynamically adjusted value. $P_{ref,k}(i-1)$ represents a reference value of received power in a previous measurement, which is obtained on the subband of the $k^{th}$ resource of the device B. By adopting foregoing method, when the device A does not measure the recent transmission corresponding to the $i^{th}$ resource of the device B, due to half-duplex limitations of failure of SA reception, the device A may still utilize the measurement value of recent received power on the same subband, e.g., the recent transmission corresponding to the $j^{th}$ resource, thereby improving timeliness of $P_{ref,k}$. In the above method, foregoing measurement value of received power of the device B may be an average value of received power on all the subbands, which are occupied by the device B within current subframe. Alternatively, foregoing measurement value of received power of the device B may be the received power of the device B, which is measured on resources occupied by the device B within current subframe, by taking subband as granularity.

Alternatively, corresponding to foregoing three methods for determining the reference value of received power, the reference value of received power of the device B after subframe n may be determined, based on change trend of each measurement value of received power of the device B within the sensing window. For example, assume that each measurement value within the sensing window is in a monotonous increasing trend, there is a great possibility that the received power of the device B is continuously increased after subframe n. Generally speaking, the measurement value of received power of the device B within the sensing window is approximated with a function. And the reference value of received power on a resource occupied by the device B after subframe n may be predicted, based on the function. Format of the prediction function is not limited by the present disclosure. For the method, which predicts the reference value of received power based on change trend of measurement value, regarding foregoing device B, a reference value $P_{ref}$ of received power of the device B may be determined. $P_{ref}$ is further used for estimating the received power of each resource occupation of the device B after subframe n. Alternatively, for foregoing device B, the reference values of received power about multiple continuous resource occupations of the device B after subframe n may be predicted. Alternatively, for each resource among K resources of the device B, the reference value of received power on a resource firstly occupied by the device B after subframe n may be predicted, which is repeatedly taken as the reference value of received power on the resource occupied by the device B within multiple periods after subframe n. Alternatively, for a resource among K resources of the device B, the reference values of received power on the resources, which are occupied by the device B within multiple continuous periods after subframe n, may be predicted.

Based on foregoing method, after calculating the reference value $P_{ref}$ of received power of the device B after subframe n, an offset value X may be superimposed. That is, when $P_{ref}$+X is greater than a threshold, the occupied resource of the device B is not available for the device A after subframe n. X is predefined, or is configured by a high level.

The value of X may depend on some other parameters of the device B. For example, X is relevant with moving speed of the device B. Generally speaking, change speed of received power may be faster, accompanying with higher moving speed. A greater offset value may be adopted, so as to avoid possible collisions. Alternatively, X may be relevant with service priority of the device B. That is, for a service with a higher priority, in order to better avoid collisions and improve transmission performances of the device B, a greater offset value may be adopted. Alternatively, X may be relevant with service type of the device B. For example, for a service transmitted periodically, since similar interferences may occur repeatedly within multiple periods, a greater offset value may be adopted, so as to avoid collisions as much as possible. For an event-triggered service, since interference is one-off or the duration of the interference is very short, a smaller offset value may be adopted. Alternatively, X may be relevant with transmission power of the device B. Interferences to other devices may be increased, accompanying with greater transmission power. Collision probability may be reduced, by configuring a greater X.

The value of X may depend on some other parameters of the device A. For example, X is relevant with moving speed of the device A. Generally speaking, change speed of received power is faster, accompanying with higher moving speed. A greater offset value may be adopted, so as to avoid possible collisions. Alternatively, X may be relevant with service priority of the device A. That is, for a service with a higher priority, in order to better avoid collisions and improve transmission performances of the device A, a greater offset value may be adopted. Alternatively, in order to obtain more available resources, a smaller X may be adopted, thereby guaranteeing transmission performances of higher-priority services of the device A. Alternatively, X may be relevant with service type of the device B. For example, for a service transmitted periodically, since similar interferences may occur repeatedly in multiple periods, a greater offset value may be adopted, so as to avoid collisions as much as possible. For an event-triggered service, since the interference is one-off or duration of the interference is very short, a smaller offset value may be adopted. Alternatively, X may be relevant with transmission power of the device A. Interferences to other devices may be increased, accompanying with greater transmission power. Collision probability may be reduced, by configuring a greater X.

The value of X may also be jointly determined, based on foregoing at least one parameter of the device A and foregoing at least one parameter of the device B. For example, X of the device B may be processed, based on a relative relationship between service priorities of device A and B. Alternatively, X of the device B may be jointly processed, based on service types of device A and device B. Still alternatively, X of the device B is jointly processed, based on moving speed of the device A and a relative relationship, which is between service priorities of device A and device B.

Figure 9:
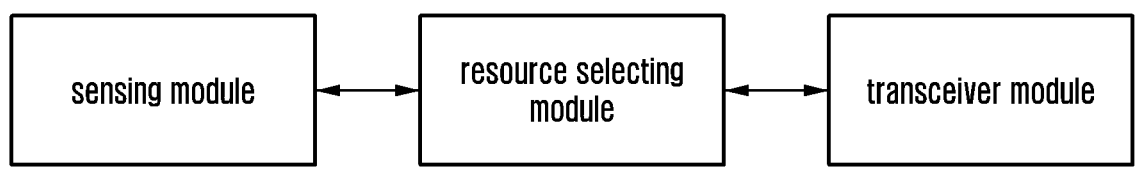
FIG. 9 is a schematic diagram illustrating a structure of a device, in accordance with an embodiment of the present disclosure.

Corresponding to foregoing method, the present disclosure also provides a device, which is configured to implement foregoing method. As shown in FIG. 9, the device includes a sensing module, a resource selecting module and a transceiver module.

The sensing module is configured to sense a SA coming from a second device, measure received power of the SA, and measure an energy of each PRB within a resource pool, and so on.

The resource selecting module is configured to select or re-select a SA and a data channel resource, based on the following information, such as, the sensed SA of the second device, resources occupied by the second device, which are indicated by the sensed SA of the second device, the received power of the SA, and the energy of each PRB within the resource pool.

The transceiver module is configured to receive the SA and data channel coming from the second device, and transmit the SA and data channel, based on the selected/re-selected channel resources.

Persons having ordinary skill in the art may understand that all the blocks, or some blocks in the method provided by foregoing embodiments may be completed by hardware, which is instructed by a program. The program may be stored in a computer readable storage medium. When executing the program, a block or combination thereof in foregoing method embodiment may be completed.

In addition, each functional unit in various embodiments of the present disclosure may be integrated into a processing module. Alternatively, each unit may be an independent physical entity. Still alternatively, at least two units may be integrated into one module. Foregoing integrated module may be implemented with hardware, or may be implemented with software functional modules. When the integrated module is implemented with software functional module, and is sold or used as an independent product, the integrated module may also be stored into one computer readable storage medium.

The foregoing storage medium may be a read-only memory (ROM), a disk, or a optical disk (CD), and so on.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of a first device for transmitting data in a wireless communication system, the method comprising:
    receiving control information scheduling first data and a demodulation reference signal (DMRS) of the control information from a second device;
    measuring a reference signal received power (RSRP) of the first data;
    identifying a resource for same transport block transmission of the first data in case of failure of receiving control information scheduling the resource for same transport block transmission of the first data;
    selecting a resource to transmit second data by excluding a resource of the first data and the resource for same transport block transmission of the first data based on the RSRP of the first data; and
    transmitting the second data on the selected resource.

2. The method of claim 1, wherein a plurality of DMRS sequences of the control information is predefined, and
    wherein a DMRS sequence is selected randomly from the plurality of the DMRS sequences of the control information.

3. The method of claim 1, wherein the RSRP of the first data is an RSRP of a DMRS of the first data.

4. The method of claim 3, wherein the first data corresponds to an initial transmission and the same transport block transmission of the first data corresponds to a retransmission.

5. The method of claim 3, wherein the first data corresponds to a retransmission and the same transport block transmission of the first data corresponds to an initial transmission.

6. The first device of claim 5, wherein the first data corresponds to an initial transmission and the same transport block transmission of the first data corresponds to a retransmission.

7. A method of a second device for receiving data in a wireless communication system, the method comprising:
    transmitting control information scheduling first data and a demodulation reference signal (DMRS) of the control information to a first device;
    transmitting the first data; and
    receiving second data on a resource,
    wherein the resource to receive the second data is selected by excluding a resource of the first data and a resource for same transport block transmission of the first data based on a reference signal received power (RSRP) of the first data.

8. The method of claim 7, wherein a plurality of DMRS sequences of the control information is predefined, and
    wherein a DMRS sequence is selected randomly from the plurality of the DMRS sequences of the control information.

9. The method of claim 7, wherein the RSRP of the first data is an RSRP of a DMRS of the first data.

10. The method of claim 9, wherein the first data corresponds to an initial transmission and the same transport block transmission of the first data corresponds to a retransmission.

11. The method of claim 9, wherein the first data corresponds to a retransmission and the same transport block transmission of the first data corresponds to an initial transmission.

12. A first device for transmitting data in a wireless communication system, the first device comprising:
    a transceiver; and
    a controller coupled with the transceiver and configured to:
        receive control information scheduling first data and a demodulation reference signal (DMRS) of the control information from a second device,
        measure a reference signal received power (RSRP) of the first data,
        identify a resource for same transport block transmission of the first data in case of failure of receiving control information scheduling the resource for same transport block transmission of the first data,
        select a resource to transmit second data by excluding a resource of the first data and the resource for same transport block transmission of the first data based on the RSRP of the first data, and
        transmit the second data on the selected resource.

13. The first device of claim 12, wherein a plurality of DMRS sequences of the control information is predefined, and
    wherein a DMRS sequence is selected randomly from the plurality of the DMRS sequences of the control information.

14. The first device of claim 12, wherein the RSRP of the first data is an RSRP of a DMRS of the first data.

15. The first device of claim 14, wherein the first data corresponds to a retransmission and the same transport block transmission of the first data corresponds to an initial transmission.

16. A second device for receiving data in a wireless communication system, the second device comprising:
    a transceiver; and
    a controller coupled with the transceiver and configured to:
        transmit control information scheduling first data and a demodulation reference signal (DMRS) of the control information to a first device,
        transmit the first data, and
        receive second data on a resource,
    wherein the resource to receive the second data is selected by excluding a resource of the first data and a resource for same transport block transmission of the first data based on a reference signal received power (RSRP) of the first data.

17. The second device of claim 16,
    wherein a plurality of DMRS sequences of the control information is predefined, and
    wherein a DMRS sequence is selected randomly from the plurality of the DMRS sequences of the control information.

18. The second device of claim 16, wherein the RSRP of the first data is an RSRP of a DMRS of the first data.

19. The second device of claim 16, wherein the first data corresponds to an initial transmission and the same transport block transmission of the first data corresponds to a retransmission.

20. The second device of claim 16, wherein the first data corresponds to a retransmission and the same transport block transmission of the first data corresponds to an initial transmission.

* * * * *